United States Patent
Kosseifi et al.

(10) Patent No.: US 8,219,467 B2
(45) Date of Patent: Jul. 10, 2012

(54) SYSTEM AND METHOD FOR DISPATCHING FIELD TECHNICIANS BASED ON LOCATIONS OF VIRTUAL WAREHOUSES

(75) Inventors: Mario Kosseifi, Roswell, GA (US); Sheldon K. Meredith, Marietta, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 222 days.

(21) Appl. No.: 12/332,984

(22) Filed: Dec. 11, 2008

(65) Prior Publication Data
US 2010/0153165 A1 Jun. 17, 2010

(51) Int. Cl.
*G06Q 10/00* (2012.01)
(52) U.S. Cl. ........................................ 705/28
(58) Field of Classification Search .................. None
See application file for complete search history.

(56) References Cited

U.S. PATENT DOCUMENTS

| | | | |
|---|---|---|---|
| 5,737,728 A | 4/1998 | Sisley et al. | |
| 5,774,876 A | 6/1998 | Woolley et al. | |
| 6,212,393 B1 | 4/2001 | Suarez et al. | |
| 6,370,231 B1 | 4/2002 | Hice | |
| 6,529,877 B1 | 3/2003 | Murphy et al. | |
| 6,735,293 B2 | 5/2004 | Doherty et al. | |
| 6,820,038 B1 | 11/2004 | Wetzer et al. | |
| 6,832,092 B1 | 12/2004 | Suarez et al. | |
| 6,962,531 B2 | 11/2005 | Pace et al. | |
| 7,103,476 B2 | 9/2006 | Smith et al. | |
| 7,117,160 B1 | 10/2006 | Haynes et al. | |
| 7,171,372 B2 | 1/2007 | Daniel et al. | |
| 7,292,939 B2 | 11/2007 | Smith et al. | |
| 7,295,924 B2 | 11/2007 | Smith et al. | |
| 7,340,037 B1 | 3/2008 | Jean et al. | |
| 7,346,531 B2 | 3/2008 | Jacobs | |
| 7,433,830 B2 | 10/2008 | Ingman et al. | |
| 7,464,046 B2 | 12/2008 | Wilson et al. | |
| 2002/0019699 A1* | 2/2002 | McCarty et al. | 701/211 |
| 2003/0083060 A1 | 5/2003 | Menendez | |
| 2005/0094772 A1 | 5/2005 | Harrison et al. | |
| 2006/0074764 A1 | 4/2006 | Schmitt et al. | |
| 2006/0276204 A1 | 12/2006 | Simpson et al. | |
| 2007/0081633 A1 | 4/2007 | Rives et al. | |

OTHER PUBLICATIONS

"TechRoute—Intelligent Dispatch Optimization," 3-Point Technologies, Inc., Aug. 25, 2008, http://3pointtechnologies.com/techroute.html.

(Continued)

*Primary Examiner* — Faris Almatrahi
(74) *Attorney, Agent, or Firm* — Parks IP Law LLC; Mickki D. Murray, Esq.

(57) ABSTRACT

A method is disclosed for determining a technician to dispatch to a customer site requiring a service call. A first plurality of technicians assigned to a customer site requiring a service call is determined. A location of each of the technicians is also determined. A first plurality of distances is determined between each of the technicians and a plurality of locations at which is disposed equipment needed for the service call. A second plurality of distances is determined between each of the technicians and a plurality of service vehicles at which is disposed the equipment needed for the service call. One of the technicians is dispatched to the customer site based on the location of each of the technicians, on the first plurality of distances, and on the second plurality of distances. A system for implementing the method is also disclosed.

12 Claims, 4 Drawing Sheets

OTHER PUBLICATIONS

"Case Study: Field Force Automation Saves the Day for Mac-Gray," Eric Zeman, InformatiojnWeek's Mobile Weblog, Jul. 27, 2007, http://www.informationweek.com/blog/main/archives/2007/07/case_study_fiel.html.

"The Nexterna™ Clearview Dispatch," Aug. 25, 2008, Dispatch Board Data Sheet, Aug. 25, 2008, http://www.nexterna.com/clearview/features.

"Follow the Fleet," Internet World Magazine m-commerce, Mar. 1, 2002, http://www.iw.com/magazine.php?inc=030102/03.01.02mcomm2.html.

"Intermec Field Service Solutions: Inventory Asset Optimization," Aug. 25, 2008, http://www.intermec.com/solutions/field_service/inventory_optimization.aspx.

"Service Automation Customer Success Story," About Sybase, Inc., Aug. 25, 2008, Service Automation Success Story: Development.

"Featured Resources," Better Manage Field Service Parts and People, Servigistics Newsletter, Jan. 7, 2007, http://www.servigistics.com/news/articles/archives.html.

* cited by examiner

SYSTEM AND METHOD FOR DISPATCHING FIELD TECHNICIANS BASED ON LOCATIONS OF VIRTUAL WAREHOUSES

FIELD OF THE DISCLOSURE

The present disclosure generally relates to communications networks, and more particularly relates to a system and method for dispatching field technicians based on locations of virtual warehouses.

BACKGROUND

Field technicians in a variety of commercial and governmental disciplines travel to multiple sites in different geographic locations in order to audit, repair, replace, or otherwise maintain the systems located at the site. A field technician can be assigned to maintain a number of different sites. Particular equipment may be required at any given site depending on the nature of the problem. If the field technician does not have that particular equipment with him, the field technician often must retrieve it from a warehouse.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
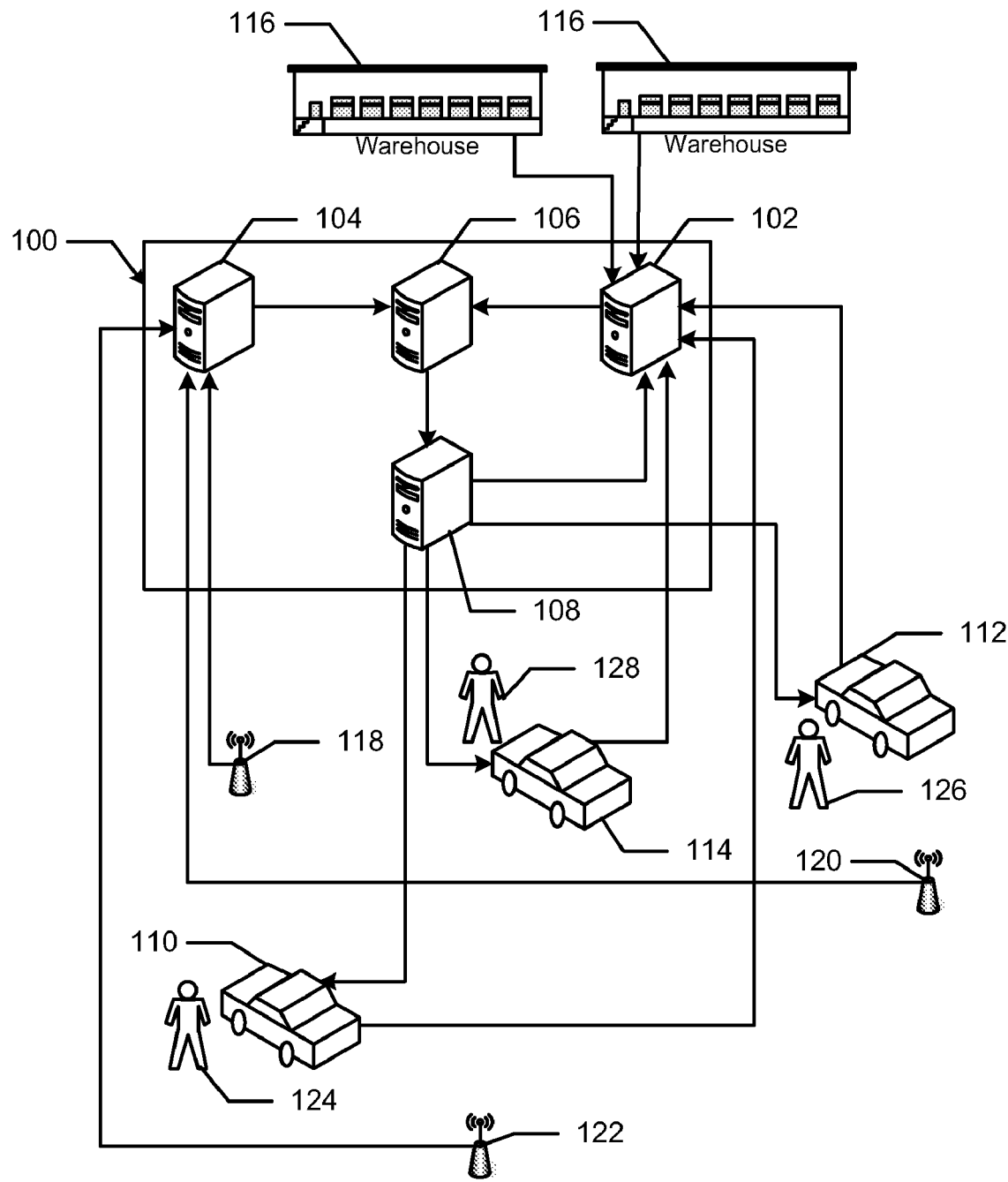
FIG. 1 is schematic diagram of a customer site problem ticket dispatch system.

FIG. 1 shows a customer site problem ticket dispatch system 100 including a site location server 102, a service call system server 104, a decision process server 106, and a trouble ticket dispatch server 108. The site location server 102 is in communication with the decision process server 106, with the trouble ticket dispatch server 108, with multiple service vehicles 110, 112, and 114, and with a plurality of warehouses 116. The service call system server 104 is in communication with the decision process server 106, and with multiple customer sites 118, 120, and 122. The decision process server 106 is in communication with the trouble ticket dispatch server 108, which in turn is in communication with the multiple service vehicles 110, 112, and 114.

Each of the service vehicles 110, 112, and 114 is preferably equipped with a Global Positioning System (GPS) device, an assisted GPS (A-GPS) device, and the like. The site location server 102 can communicate with the GPS devices through a wireless connection, such that the location of the service vehicles can be updated in the site location server. The site location server 102 can additionally receive and maintain information indicating the inventory of each of the service vehicles, and whether each of the technicians 124, 126, and 128 respectively associated with service vehicles 110, 112, and 114 are idle or currently working at a customer site.

The site location server 102 can store information indicating which of the technicians 124, 126, and 128 are assigned to which of the customer sites 118, 120, and 122. The technicians 124, 126, and 128 can be assigned to a customer site based on the skill of the technician, the type of equipment located at the customer site, and the ability of the technician to replace and/or repair the equipment at the customer site. For example, each of the technicians 124, 126, and 128 can be assigned to each of the customer sites 118, 120, and 122, such that any of the technicians can be dispatched to any of the customer sites. Alternatively, the technician 124 can be assigned to the customer sites 118, 120, and 122, the technician 126 can be assigned to the customer sites 118 and 120, and the technician 128 can be assigned only to the customer site 118. Thus, if there is a service call for the customer site 120, either the technician 124 or the technician 126 can be dispatched to the customer site to address the problem.

Every time a piece of equipment is added to or removed from one of the service vehicles 110, 112, and 114, a barcode, a radio frequency identification (RFID) tag, and/or any other type of identification on the piece of equipment can be scanned by the technician. The technician can use any handheld device having a barcode reader and/or an RFID scanner as part of the device, or connected to the device, to scan the piece of equipment. After the barcode and/or RFID tag is scanned, the handheld device can send information indicating the addition or removal of the equipment in the inventory of the service vehicle to the site location server 102. Based on the information received from the handheld device, the site location server 102 can continually update a virtual inventory for each of the service vehicles 110, 112, and 114. The technicians 124, 126, and 128 can also use the handheld devices to indicate whether the technicians are idle or currently working at a customer site. For example, the technician 124 can press a button on the handheld device when he begins working at the customer site 122 and then press the button again when he finishes working at the customer site. Each time the button is pressed information about the status of the technician can be sent to the site location server 102. Thus, the site location server 102 can store the status of the technicians along with the current location and the inventory of each of the service vehicles 110, 112, and 114 for use by the decision process server 106.

The service call system server 104 can receive a service call signal from each of the customer sites 118, 120, and 122. The service call signal can include information about the location of the customer site, a type of problem occurring at the customer site, and the like. After receiving the service call signal, the service call system server 104 can send information indicating the problem type and the location of the customer site requiring the service call to the decision process server 106.

After receiving the information indicating the problem type and the location of the customer site, the decision process server 106 can determine which of the technicians 124, 126, and 128 to dispatch to the customer site, and can determine what equipment, if any, is needed for the service call at the customer site based on the problem type. The equipment needed for the service call at the customer site can be telecommunications equipment, a spare part or component, a tool needed to make any necessary repairs, and the like. The decision process server 106 can use the information from the site location server 102 to determine which of the technicians 124, 126, and 128 are assigned to the customer site requiring the service call, which of these technicians are idle, and the location of the equipment needed at the customer site. The technicians assigned to the customer site can be those that have the ability to handle the anticipated service call. The decision process server 106 can also use the information from the site location server 102 to determine the equipment in the inventory of the service vehicles 110, 112, and 114, and then can compare these inventories to the anticipated equipment required for the service call.

The decision process server 104 can then determine a total transit time for each of the technicians 124, 126, and 128. The total transit can be estimated for each of the technicians 124, 126, and 128 by accounting for the total distance required for the technician to travel from his current location to the location of the equipment needed for the customer site, and then to the customer site. The equipment needed for the customer site could be located on one of the service vehicles 110, 112, and 114 or could be located in one or more of the warehouses 116.

Based on the status of technicians assigned to the customer site requiring the service call, the location of the equipment needed for customer site, and the total transit time for each of the technicians, the decision process server 106 can select one of the technicians 124, 126, and 128 to be dispatched to the customer site requiring the service call. The decision process server 106 can then send information indicating the selected technician to the trouble ticket dispatch server 108 as a technician dispatch request. After receiving the information, the trouble ticket dispatch server 108 can verify that the selected technician is still idle and the location of the equipment needed for the customer site with the site location server 102. After verification, the trouble ticket dispatch server 108 can wirelessly transmit an electronic service ticket to the selected technician.

In an exemplary ticket dispatch process, the customer site 120 can send a service call signal to the service call server 104, which can use the service call signal to determine the location of the customer site and the problem, such as the malfunction of a specific piece of equipment. The service call server 104 can then send information indicating the location of the customer site 120 and the piece of equipment that is needed for the customer site to the decision process server 106. The decision process server 106 can then receive information indicating that all of the technicians 124, 126, and 128 are assigned to the customer site 120 from the site location server 102. The next information received at the decision process server 106 can be that the technicians 126 and 128 are idle. The site location server 102 can also send information indicating the inventory of each of the service vehicles 110, 112, and 114 to the decision process server 106.

The decision process server 106 can compare the inventories of the service vehicles 110, 112, and 114 with the equipment needed for the customer site 120, and can determine that the equipment needed is located on the service vehicle 110. The decision process server 106 can then use all of the information above to determine that the total transit time for the technician 128 is less than the total transit time for the technician 126. Thus, the decision process server 106 can recommend to the trouble ticket dispatch server 108 that the technician 128 should be dispatched to the customer site 120, should get the needed equipment from the service vehicle 110, and should then to go to the customer site 120 requiring the service call. The dispatch ticket server 108 can then verify that the equipment needed is still in the inventory of the service vehicle 110 and that the technician 128 is still idle with the site location server 102. Upon receiving the verification, the dispatch ticket server 108 can wirelessly transmit a service ticket to the technician 128.

The technician 128 can travel to the service vehicle 110 to retrieve the equipment needed and then travel to the customer site 120 requiring the service call. As the equipment needed is moved from the service vehicle 110 to the service vehicle 114, the equipment is checked off of the inventory for the service vehicle 110 and added to the inventory of the service vehicle 114. Information indicating the results of this equipment transfer can be wirelessly transmitted to the site location server 102, which can then have an updated inventory for each of the service vehicles 110, 112, and 114.

Figure 2:
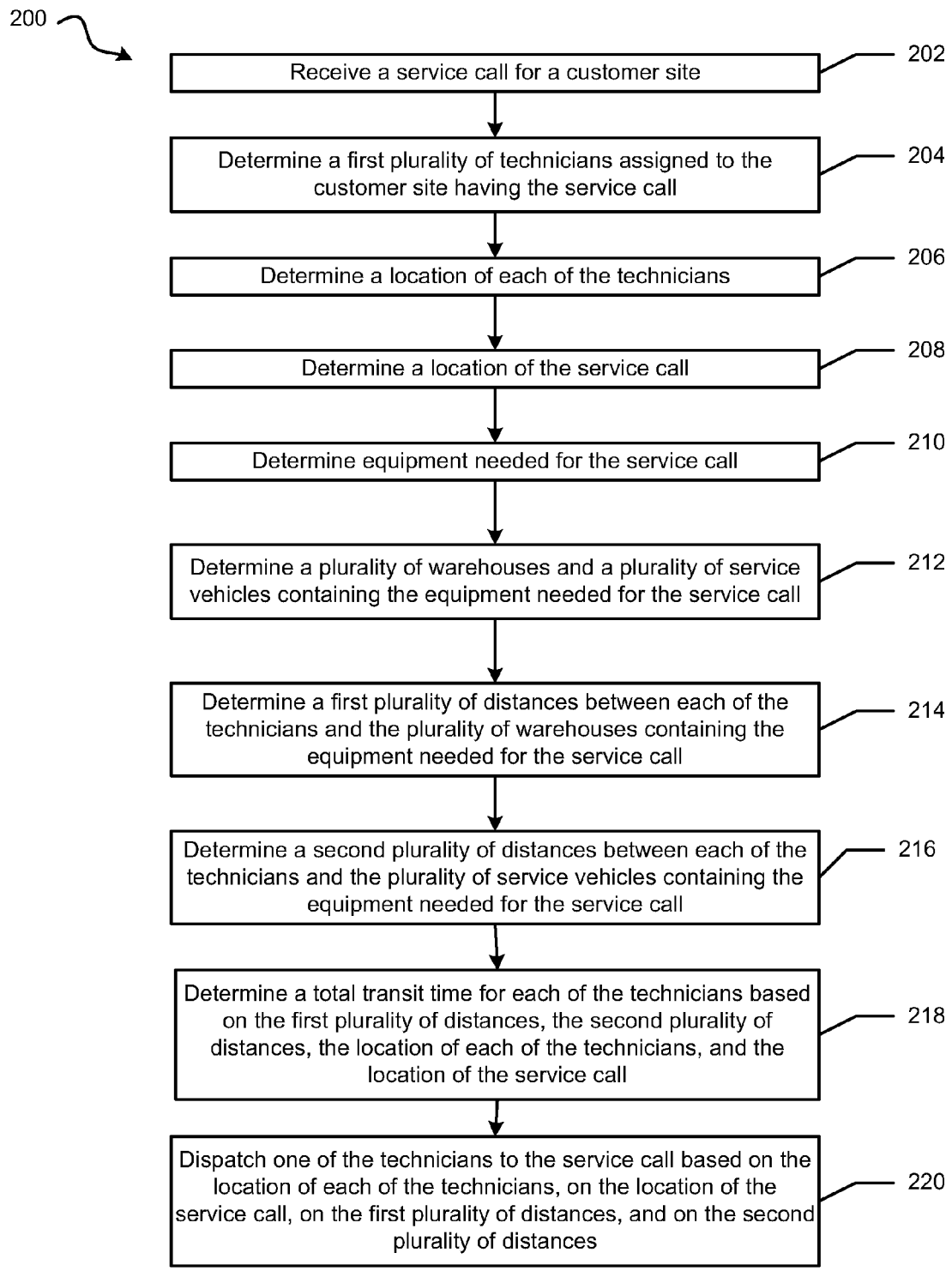
FIG. 2 is flow diagram of a method for determining a technician to dispatch to a customer site requiring a service call.

FIG. 2 shows a method 200 for determining a technician to dispatch to a customer site requiring a service call. At block 202, a service call is received for a customer site. A first plurality of technicians assigned to the customer site requiring the service call is determined 204. At block 206, a location of each of the technicians is determined. A location of the service call is determined at block 208. At block 210, equipment needed for the service call is determined. A plurality of warehouses and a plurality of service vehicles at which is disposed the equipment needed for the service call are determined at block 212.

At block 214, a first plurality of distances is determined between each of the technicians and the plurality of warehouses at which is disposed the equipment needed for the service call. A second plurality of distances is determined between each of the technicians and the plurality of service vehicles containing the equipment needed for the service call at block 216. At block 218, a total transit time is determined for each of the technicians based on the first plurality of distances, the second plurality of distances, the location of each of the technicians, and the location of the service call. One of the technicians is dispatched to the service call based on the location of each of the technicians, on the location of the service call, on the first plurality of distances, and on the second plurality of distances at block 220.

Figure 3:
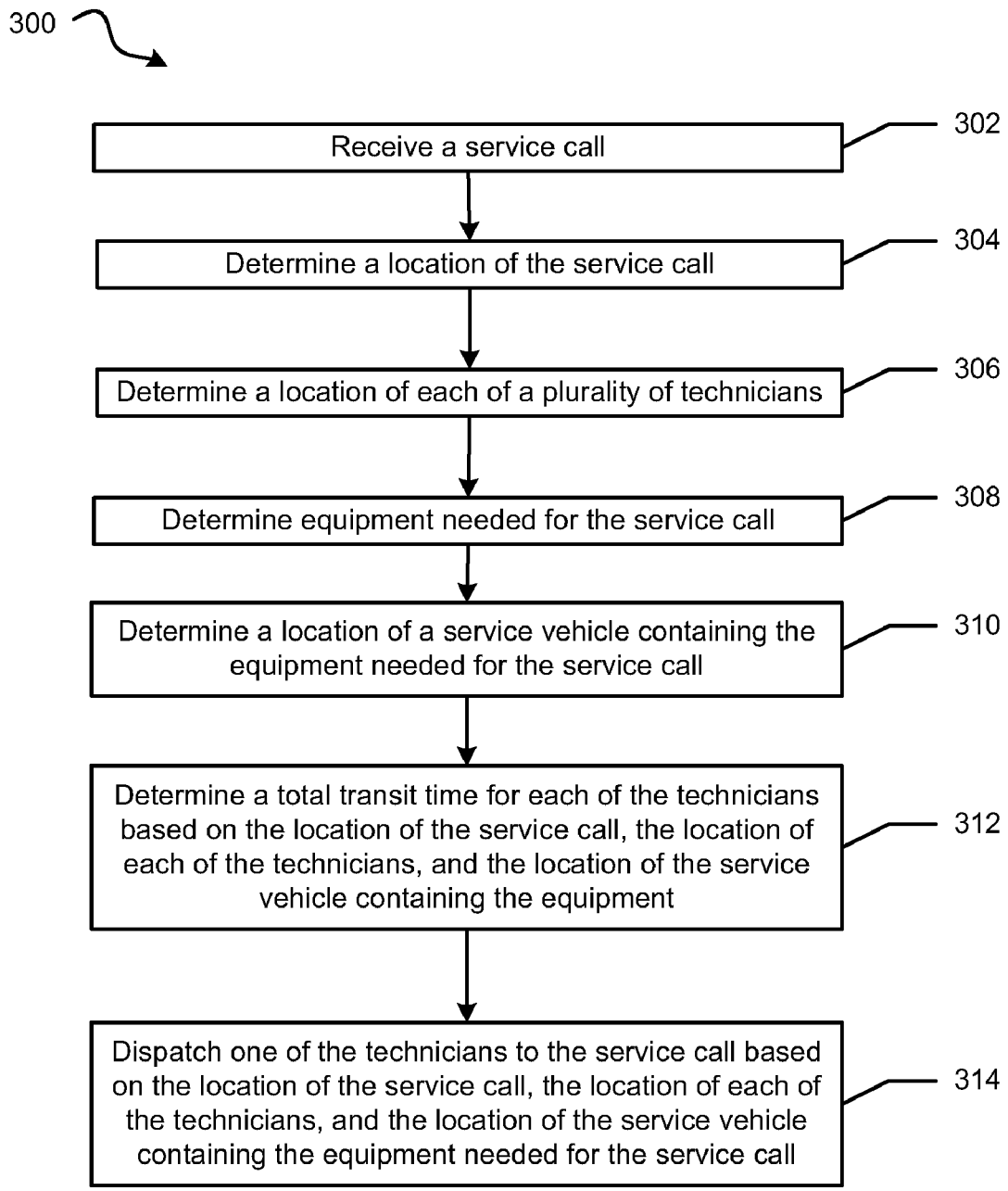
FIG. 3 is flow diagram of an alternative method for determining a technician to dispatch to a customer site requiring the service call.

FIG. 3 shows an alternative method 300 for determining a technician to dispatch to a customer site requiring a service call. At block 302, a service call is received. A location of the service call is determined at block 304. At block 306, a location of each of a plurality of technicians is determined. Equipment needed for the service call is determined at block 308. At block 310, a location of a service vehicle containing the equipment needed for the service call is determined. A total transit time is determined for each of the technicians based on the location of the service call, the location of each of the technicians, and the location of the service vehicle containing the equipment at block 312. At block 314, one of the technicians is dispatched to the service call based on the location of the service call, the location of each of the technicians, and the location of the service vehicle containing the equipment needed for the service call. The one of the technicians can be dispatched in response to the location of the technician being the closest to the location of the service call and to the location of the service vehicle containing the equipment needed for the service call with respect to the other technicians.

Figure 4:
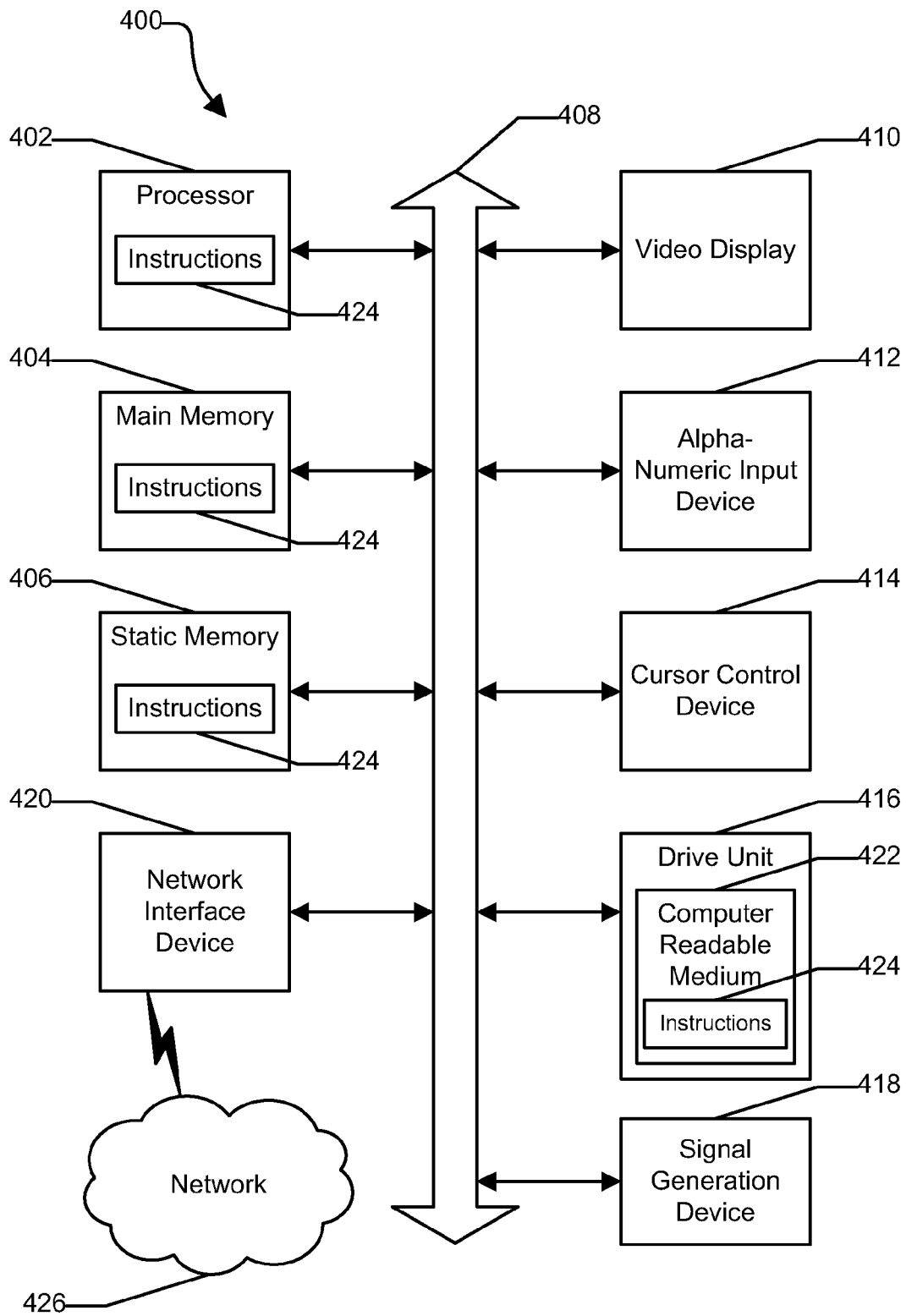
FIG. 4 is a block diagram of a general computer system.

FIG. 4 shows an illustrative embodiment of a general computer system 400 in accordance with at least one embodiment of the present disclosure. The computer system 400 can include a set of instructions that can be executed to cause the computer system to perform any one or more of the methods or computer based functions disclosed herein. The computer system 400 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

The computer system 400 may include a processor 402, e.g., a central processing unit (CPU), a graphics processing unit (GPU), or both. Moreover, the computer system 400 can include a main memory 404 and a static memory 406 that can communicate with each other via a bus 408. As shown, the computer system 400 may further include a video display unit 410, such as a liquid crystal display (LCD), an organic light emitting diode (OLED), a flat panel display, a solid state display, or a cathode ray tube (CRT). Additionally, the computer system 400 may include an input device 412, such as a keyboard, and a cursor control device 414, such as a mouse. The computer system 400 can also include a disk drive unit 416, a signal generation device 418, such as a speaker or remote control, and a network interface device 420.

In a particular embodiment, as depicted in FIG. 4, the disk drive unit 416 may include a computer-readable medium 422 in which one or more sets of instructions 424, e.g. software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media. The network interface device 420 can provide connectivity to a network 426, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 424 or receives and executes instructions 424 responsive to a propagated signal, so that a device connected to a network 426 can communicate voice, video or data over the network 426. Further, the instructions 424 may be transmitted or received over the network 426 via the network interface device 420.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method comprising:
    identifying, at a server, a plurality of first service vehicles assigned to a service site in need of a service visit;
    obtaining, at the server, a service-visit location of the service site;
    obtaining, at the server, a first location of each of the first service vehicles;
    determining, at the server, a first plurality of distances between each of the first locations and a plurality of storage locations at which are disposed equipment for the service visit;
    determining, at the server, a second plurality of distances between each of the first locations and second locations corresponding to a plurality of second service vehicles at which are disposed the equipment for the service visit;
    determining, at the server, multiple total transit times for each of the first service vehicles, each of the total transit times representing an amount of time for the first service vehicle to travel from its first location to (i) one of the second locations and then to the service site or (ii) one of the storage locations and then to the service site, wherein determining the total transit times for each of the first service vehicles is based on:
        (a) the first plurality of distances corresponding to the first service vehicle;
        (b) the second plurality of distances corresponding to the first service vehicle; and
        (c) the service-visit location; and
    dispatching one of the first service vehicles to the service site based on the total transit times for the first service vehicles.

2. The method of claim 1 further comprising determining the storage locations and the second locations prior to determining the first plurality of distances.

3. The method of claim 1 wherein the storage locations are associated with warehouses.

4. The method of claim 1 wherein the equipment comprises telecommunications equipment.

5. A non-transitory computer-readable storage medium having stored thereon instructions that, when executed by a processor cause the processor to perform a method comprising:
    identifying a plurality of first service vehicles assigned to a service site in need of a service visit;
    obtaining a service-visit location of the service site;
    obtaining a first location of each of the first service vehicles;
    determining a first plurality of distances between each of the first locations and a plurality of storage locations at which are disposed equipment for the service visit;
    determining a second plurality of distances between each of the first locations and second locations corresponding to a plurality of second service vehicles at which are disposed the equipment for the service visit;
    determining multiple total transit times for each of the first service vehicles, each of the total transit times representing an amount of time for the first service vehicle to travel from its first location to (i) one of the second locations and then to the service site or (ii) one of the storage locations and then to the service site, wherein determining the total transit times for each of the first service vehicles is based on:
        (a) the first plurality of distances corresponding to the first service vehicle;
        (b) the second plurality of distances corresponding to the first service vehicle; and
        (c) the service-visit location; and
    dispatching one of the first service vehicles to the service site based on the total transit times for the first service vehicles.

6. The non-transitory computer-readable storage medium of claim 5 wherein the instructions, when executed by the processor, cause the processor to determine the storage locations and the second locations prior to determining the first plurality of distances.

7. The non-transitory computer-readable storage medium of claim 5 wherein the storage locations are associated with warehouses.

8. The non-transitory computer-readable storage medium of claim 5 wherein the equipment comprises telecommunications equipment.

9. A server comprising:
    a processor; and
    a non-transitory computer-readable storage medium having stored thereon instructions that, when executed by the processor cause the processor to perform a method comprising:
        identifying a plurality of first service vehicles assigned to a service site in need of a service visit;
        obtaining a service-visit location of the service site;
        obtaining a first location of each of the first service vehicles;
        determining, at the server, a first plurality of distances between each of the first locations and a plurality of storage locations at which are disposed equipment for the service visit;
        determining a second plurality of distances between each of the first locations and second locations corresponding to a plurality of second service vehicles at which are disposed the equipment for the service visit;
        determining multiple total transit times for each of the first service vehicles, each of the total transit times representing an amount of time for the first service vehicle to travel from its first location to (i) one of the second locations and then to the service site or (ii) one of the storage locations and then to the service site, wherein determining the total transit times for each of the first service vehicles is based on:
            (a) the first plurality of distances corresponding to the first service vehicle;

(b) the second plurality of distances corresponding to the first service vehicle; and
(c) the service-visit location; and
dispatching one of the first service vehicles to the service site based on the total transit times for the first service vehicles.

10. The server of claim 9 wherein the instructions, when executed by the processor, cause the processor to determine the storage locations and the second locations prior to determining the first plurality of distances.

11. The server of claim 9 wherein the storage locations are associated with warehouses.

12. The server of claim 9 wherein the equipment comprises telecommunications equipment.

* * * * *